(12) United States Patent
Keller et al.

(10) Patent No.: US 11,009,484 B1
(45) Date of Patent: May 18, 2021

(54) VELOCITY INDEPENDENT TWO-COMPONENT MAGNETIC FLUX LEAKAGE DETECTIVE SYSTEM

(71) Applicant: The University of Tulsa, Tulsa, OK (US)

(72) Inventors: Michael W. Keller, Tulsa, OK (US); Brynn Arraina Jellison, Tulsa, OK (US); Samuel G. Laney, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 0 days.

(21) Appl. No.: 16/889,025

(22) Filed: Jun. 1, 2020

Related U.S. Application Data

(63) Continuation of application No. 15/457,716, filed on Mar. 13, 2017.

(60) Provisional application No. 62/306,925, filed on Mar. 11, 2016.

(51) Int. Cl.
*G01N 27/82* (2006.01)

(52) U.S. Cl.
CPC .................. *G01N 27/82* (2013.01)

(58) Field of Classification Search
CPC .................................................. G01N 27/82
USPC ........................................ 324/232, 228–243
See application file for complete search history.

(56) References Cited

U.S. PATENT DOCUMENTS

| | | |
|---|---|---|
| 4,468,619 A | 8/1984 | Reeves |
| 4,675,604 A | 6/1987 | Moyer et al. |
| 4,789,827 A | 12/1988 | Bergander |
| 5,105,151 A | 4/1992 | Takahashi et al. |
| 5,128,613 A | 7/1992 | Takahashi |
| 5,293,117 A | 3/1994 | Hwang |
| 5,491,409 A | 2/1996 | Flora et al. |
| 6,150,809 A | 11/2000 | Tiernan et al. |
| 6,888,346 B2 | 5/2005 | Wincheski et al. |
| 6,995,557 B2 | 2/2006 | Goldfine et al. |
| 7,795,864 B2 | 9/2010 | Barolak et al. |
| 7,944,203 B2 | 5/2011 | Hatanaka et al. |
| 2004/0004475 A1 | 1/2004 | Goldfine et al. |
| 2004/0040389 A1 | 3/2004 | Buttle |
| 2004/0041560 A1 | 3/2004 | Walters et al. |
| 2005/0007108 A1 | 1/2005 | Dogaru |
| 2009/0139335 A1 | 6/2009 | Kroning et al. |
| 2010/0219818 A1 | 9/2010 | Fischer et al. |

(Continued)

OTHER PUBLICATIONS

Jellison, "Corrosion Flaw Detection using magnetic Flux Leakage and Giant Magnetoresistive Sensors", "Thesis", , Publisher: The University of Tulsa; The Graduate School; 2013.

*Primary Examiner* — Jay Patidar
(74) *Attorney, Agent, or Firm* — GableGotwals

(57) ABSTRACT

A device, system and method for detecting flaws in a magnetic material includes a wheeled scanner having two detectors and arranged for travel over a flat surface. The first detector is a horizontal magnet-sensor arrangement that generates a magnetic field in a direction generally parallel to a central horizontal axis of the scanner. The second is a vertical magnet-sensor arrangement that generates a magnetic field in a direction generally perpendicular to the central horizontal axis of the scanner. A set of computer executable instructions uses data collected by the first detector to detect a flaw in the magnetic material and data collected at a same time by the second detector to determine a location of the detected flaw relative to a top and bottom surface of the magnetic material.

12 Claims, 3 Drawing Sheets

(56) References Cited

U.S. PATENT DOCUMENTS

2012/0253696 A1 10/2012 Pearson et al.
2015/0316508 A1 11/2015 Lee et al.
2016/0238564 A1 8/2016 Owens et al.

VELOCITY INDEPENDENT TWO-COMPONENT MAGNETIC FLUX LEAKAGE DETECTIVE SYSTEM

CROSS-REFERENCE TO PENDING APPLICATIONS

This is a continuation application which claims priority to U.S. patent application Ser. No. 15/457,716, filed Mar. 13, 2017, which claimed priority to U.S. Provisional Patent Application No. 62/306,925, filed Mar. 11, 2016, both of which are incorporated herein by reference.

BACKGROUND OF THE INVENTION

Above ground oil tanks require regular inspection for corrosion flaws. The oil in the tank, as well as the soil underneath the tank, can corrode the tank over time.

Magnetic flux leakage ("MFL") is one technique that is commonly used in corrosion flaw detection for pipelines and flat plates. In a flat plate without any flaw, magnetic flux passes unperturbed from one magnet to another through the flat plate. When a flaw is introduced into the plate, the magnetic flux tends to bulge around the flaw and out of the plate due to the change in permeability. This stray magnetic flux can be picked up with any flux sensing device. Any spike in magnetic flux is indicative of a significant change in plate dimensions at that point.

In the past, induction coil sensors were common for MFL applications. Because induction occurs due to a change in magnetic flux, and change in magnetic flux will vary depending on the speed of the sensor moving over the flaw, induction coil sensors are velocity dependent. Velocity dependence means that the signal response of the magnetic flux sensing tool depends in part on the user. As such, velocity independent magnetic flux sensors are preferred.

One velocity independent option is the giant magnetoresistive ("GMR") sensor. A GMR sensor sees a large change in resistance when a magnetic field is applied. The sensor does this by sandwiching a 10-angstrom layer of copper between two layers that have particular electron spin. The first layer polarizes the passing electrons and the second layer spins similarly, opposite, or somewhere in between depending on the alignment and strength of the magnetic field. When the second layer spins oppositely, the passing electrons scatter, increasing resistance. When the second layer spins similarly, the passing electrons pass through with less scatter, lowering resistance.

GMR sensors have a single direction of sensitivity and, because of this, only magnetic flux traveling in that single direction is registered. Stronger magnetic fields more aligned with the sensor's one direction lead to a larger current through the sensor. As a sensor is turned away from the applied magnetic field, the sensor sees a sinusoidal drop off until it reaches zero signal response at 90 degrees.

There are two different types of GMR sensors: magnetometers and gradiometers. Magnetometers measure the magnitude of magnetic flux at a given point. Gradiometers measure the difference between two points of a finite distance apart on the gradiometer, essentially providing an approximation of the distance derivative of the magnetometer response.

To date, there is no velocity independent MFL detection system that can, in a single pass, reliably detect a flaw and pinpoint the flaw's location at, or toward, the top or bottom side of the plate. Horizontal arrangements can detect flaws but not pinpoint their location because the magnetic response from a top flaw is the same as that from a bottom flaw. And vertical arrangements, while capable of generating large response from top side flaws, often miss bottom side flaws (see Bradley Jellison, Corrosion Flaw Detection using Magnetic Flux Leakage and Giant Magnetoresistive Sensors, M. S. Thesis, The University of Tulsa, 2013, hereby incorporated by reference).

U.S. Pat. No. 7,944,203 B2 to Hatanaka et al. discloses a system intended to detect decreases in the thickness of a magnetic material, such as reinforcing steel, when covered by a non-magnetic material such as concrete. A magnet-resistive effect sensor is located between north pole and south pole magnets. This horizontal arrangement can detect a top or bottom flaw but cannot reliably pinpoint whether the flaw's location is at, or toward, the top or bottom side of the plate.

U.S. Pat. No. 6,150,809 to Tiernan et al. discloses a coil or solenoid that generates and applies a magnetic field generally perpendicular to the material being tested. The sensitive axis of the sensor can be arranged orthogonal to or parallel to the principal axis of the coil. Regardless of the axis' arrangement, the sensor remains located between the two pole magnets, similar to Hatanaka's horizontal arrangement and cannot pinpoint location. Additionally, the coil is velocity dependent.

US 2010/0219818 A1 to Fischer et al. discloses an array of GMR sensors electrically connected in parallel and arranged in an axial or radial direction relative to the pipe. The magnetization direction is generally parallel to the longitudinal axis of the pipe, similar to that Hatanaka's and Tiernan's horizontal arrangements.

U.S. Pat. No. 6,888,346 B2 to Wincheski et al. discloses an eddy current device that detects flaws in thick multilayer conductive materials. In one embodiment, a permanent magnet is positioned next to the sensor to bias the sensor. The sensor is not placed below the magnet and above the conductive material.

U.S. Pat. No. 6,995,557 B2 to Goldfine et al. discloses the use of high resolution conformable eddy sensor arrays arranged for transverse, diagonal, and longitudinal scanning to measure the quality characteristics of fusion welds (see see also US 2004/0004475 A1 to Goldfine et a. (disclosing eddy current sensor arrays for crack detection)). US 2005/0007108 A1 to Dogaru discloses an eddy current probe for detecting cracks initiating at the edge of holes in metallic structures.

A need exists for a velocity independent MFL detection system that can, in a single pass, reliably pinpoint a flaw and the flaw's location relative to the top or bottom side of the plate/SUMMARY An embodiment of a two-component magnetic flux leakage ("MFL") detection system uses a horizontal magnet-sensor arrangement in combination with a vertical magnet-sensor arrangement for detecting and locating flaws or corrosion damage in a metallic material. Preferably, the sensor arrangements make use of giant magnetoresistive ("GMR") sensors or Hall effect sensors, making the system velocity independent. The horizontal arrangement reliably detects a top or bottom side flaw. The vertical arrangement generates no response (or, at best, a small, often unnoticeable, response) when detecting a bottom side flaw and a large response when detecting a top side flaw. The vertical magnet-sensor's inability (or lack of reliability) in detecting bottom side flaws is used in combination with the horizontal magnet-sensor arrangement ability to detect top and bottom flaws in order to pinpoint the flaw's location at, or toward, the top or bottom side of the plate.

An embodiment of a device that implements the system and method is a wheeled cart or scanner in which the horizontal sensor is mounted on an underside of the scanner carriage, with the vertical sensor arranged at a forward or rearward end of the cart. In another embodiment, both sensors are located on the underside of the scanner carriage, with the vertical sensor located toward the forward or rearward end of the carriage. A computer processor and its associated software collect and analyze the sensor signals.

In a method using the system, the horizontal magnet-sensor arrangement identifies a flaw in the metallic material object such as a flat plate or a bottom of an oil tank. If the flaw can be visually identified, then the flaw is marked and its location entered into a database. If there is no visual identification of the flaw's location—as can be the case when the plate is coated—then the flaw is analyzed with the vertical magnet-sensor arrangement. If there is a response from the vertical magnet-sensor, then the flaw is located toward the top side of the plate. If there is no response, the flaw is at or located toward the bottom side. The flaw is then marked and its location entered into the database. Regardless of top or bottom side location, the depth of the flaw can be determined using a response model.

Objectives of this invention are to provide a flaw detection and location system, device and method that (1) is velocity independent; (2) can detect flaw location regardless of top or bottom orientation or coating thickness; (3) eliminates the need to remove coating in order to identify a flaw's location; (4) is not dependent on operator skill or technique; and (5) is portable and amenable for use in applications such as oil tank inspections.

BRIEF DESCRIPTION OF THE DRAWINGS

In FIG. 3A, the vertical sensor is located at a forward end. In FIG. 3B, the vertical sensor is located at the rearward end. In FIG. 3C, the vertical sensor is located toward the forward end on the underside of the scanner. In FIG. 3D, the vertical sensor is located toward the rearward end on the underside of the scanner. In FIG. 3E, vertical sensors are located toward the forward and rearward ends on the underside of the scanner.

ELEMENTS AND NUMBERING USED IN THE DRAWINGS AND DETAILED DESCRIPTION

Figure 7:
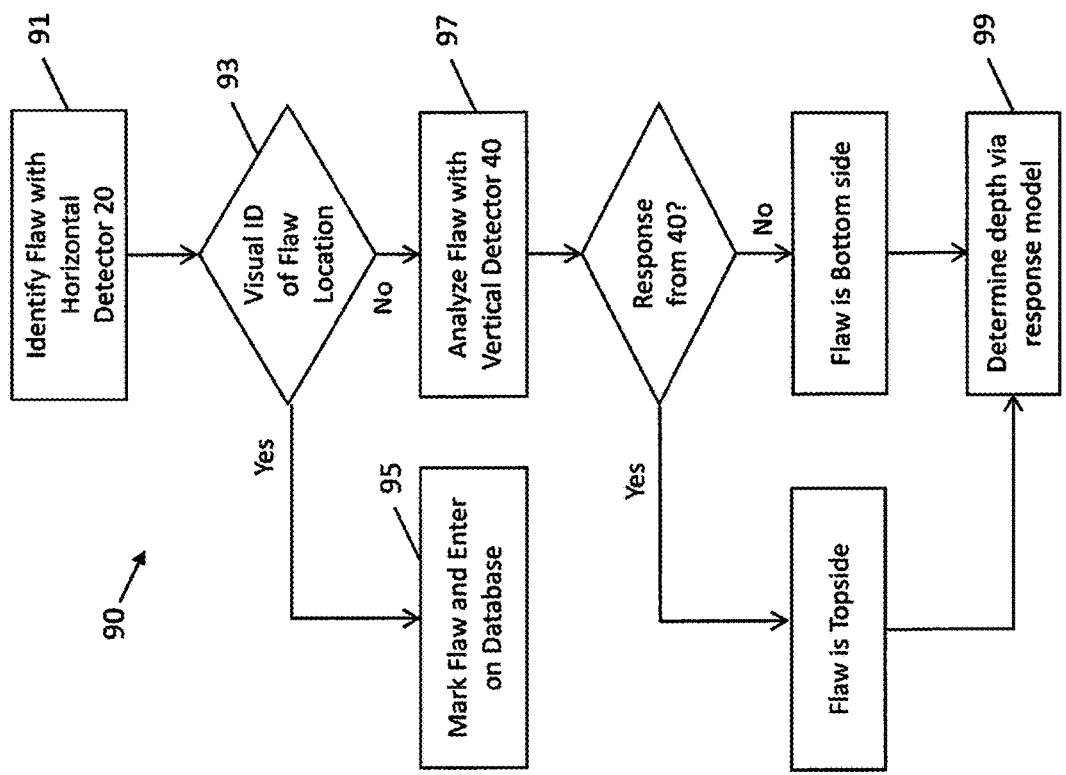
FIG. 7 is a flaw location decision tree showing an if-then (yes-no) example top and bottom flaw response as would be detected by the horizontal and vertical magnet-sensor arrangements of FIGS. 1 & 2 and of FIGS. 3A-E. Any spike in magnetic flux is indicative of a significant change in plate dimensions at that point. If there is a spike in the magnetic flux signal data of the horizontal and the vertical magnet sensors, the flaw location decision tree indicates the flaw as a topside flaw. If there is spike in the magnetic flux signal data from the horizontal magnet sensor and not one in the vertical magnet sensor, the flaw location decision tree indicates the flaw as a bottom side flaw.
Figure 1:
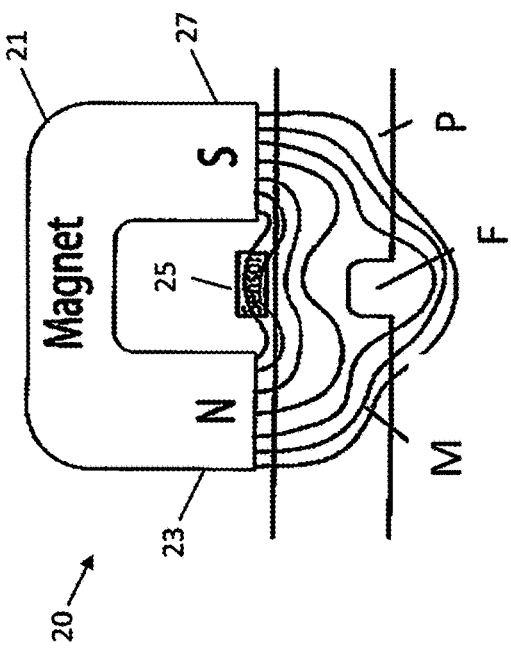
FIG. 1 is an embodiment of a horizontal magnet-sensor arrangement like that used in the scanner embodiments of FIGS. 3A-E.
Figure 2:
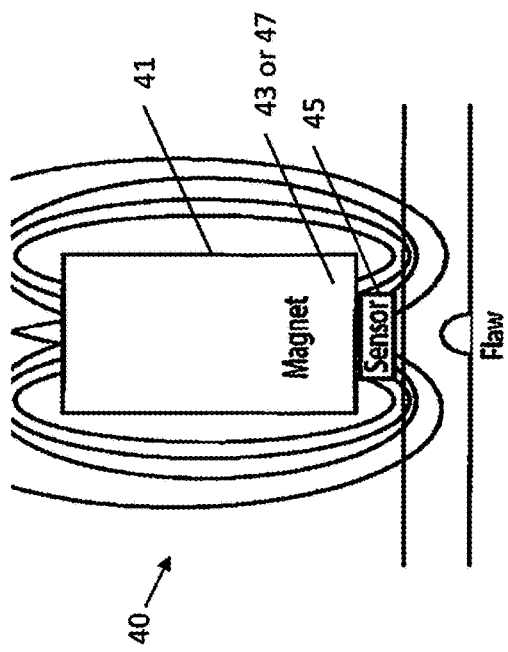
FIG. 2 is an embodiment of a vertical magnet-sensor arrangement like that used in the scanner embodiments of FIGS. 3A-E.
Figure 3A:
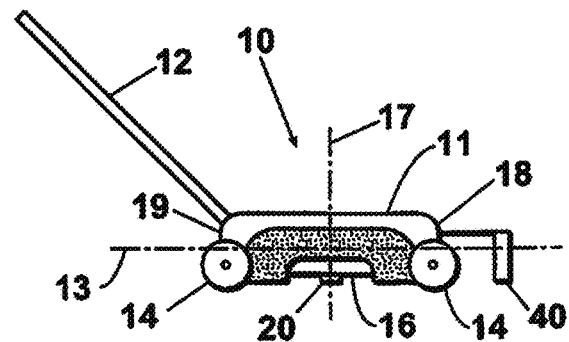
FIG. 3A-E are embodiments of a scanner that implements the two-component magnetic flux leakage ("MFL") system and method.
Figure 3B:
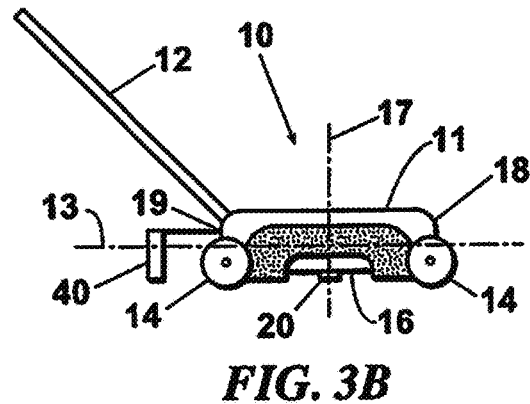
Figure 3C:
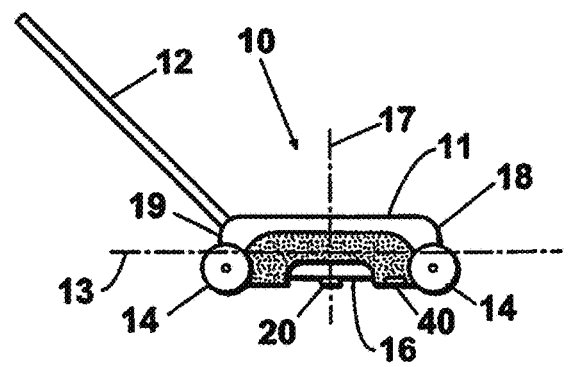
Figure 3D:
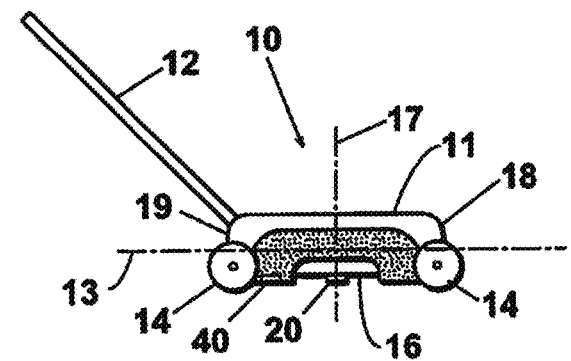
Figure 3E:
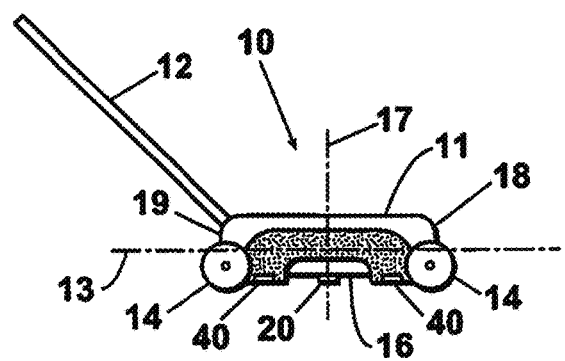

10 Wheeled cart or scanner
11 Carriage
12 Handle
13 Central horizontal axis (longitudinal or lateral)
14 Wheels
15 Electronics associated with 20 or 40
16 Underside
17 Central vertical axis
18 Forward end
19 Rearward end
20 Horizontal magnet-sensor arrangement (first detector)
21 Permanent two-pole magnet (first magnet or first magnet array)
23 North pole
25 Giant magnetoresistive ("GMR") or Hall effect sensor (first sensor or first sensor array)
27 South pole
40 Vertical magnet-sensor arrangement (second detector)
41 Permanent two-pole magnet (second magnet or second magnet array)
43 North pole
45 GMR or Hall effect sensor (second sensor or second sensor array)
47 South pole
70 Communication interface/network
80 Computing device
81 Processor
83 Computer readable media
85 Memory
90 Flaw detection method
91 Identifying flaw with 20
93 Visually identifying flaw location
95 Marking flaw location and entering it into a database
97 Analyzing flaw with 40
99 Determining flaw depth via a response model

DETAILED DESCRIPTION

A system for detecting flaws in a magnetic material includes a wheeled scanner having:

a first detector with a giant magnetoresistive ("GMR") sensor located between opposite poles of a first magnet, a magnetic field generated by the first magnet being in a direction generally parallel to a central axis of the scanner;

a second detector with a second GMR sensor located below a second magnet which, in turn, is arranged directly above the GMR sensor, a magnetic field generated by the second magnet being in a direction generally perpendicular to the central axis of the scanner; and a set of computer executable instructions stored on non-transitory computer readable medium and executed by a microprocessor, the set of computer executable instructions using data collected by the first detector to detect a flaw in the magnetic material and using data collected by the second detector to determine a location of the detected flaw relative to a top and bottom surface of the magnetic material.

The first and second detectors can be separate magnet/sensor arrangements or the second sensor can be integrated into the magnet of the first sensor. The second sensor provides the top or bottom flaw location detection.

A method of detecting and locating a flaw in the flat magnetic material includes the steps of:
- passing the scanner over a surface of the flat magnetic material;
- collecting a first data set using the scanner's first detector;
- analyzing the first data set to determine a presence of a flaw in the magnetic material;
- collecting a second data set using the scanner's second detector; and
- analyzing the second data set to determine whether the detected flaw is on a topside or a bottom side of the flat magnetic material.

The analyzing steps are implemented by a set of computer executable instructions stored on non-transitory computer readable medium and executed by a microprocessor.

Referring to FIGS. 1 to 3E, an embodiment of a velocity independent two-component magnetic flux leakage ("MFL") system, device, and method includes at least one horizontal magnet-sensor arrangement 20 and at least one vertical magnet-sensor arrangement 40 located on a wheeled cart or scanner 10. In the horizontal magnet-sensor arrangement 20, GMR or Hall effect sensor 25 is positioned between the north and south poles 23, 27 of a first permanent magnet 21. In the vertical arrangement 40, a GMR or Hall effect sensor 45 is placed directly below one of the poles 43, 47 of a second permanent magnet 41.

Any top or bottom side flaw "F" in a metallic material such as a flat plate "P" perturbs the magnetic flux lines M between the two poles 23, 27 and 43, 47 due to the change in permeability. The magnet 21 generates a magnetic field or flux lines M generally parallel to a central axis 13 of the scanner 10 (and therefore to a central axis of the flat plate P). The magnet 41 generates a magnetic field generally perpendicular to the central axis 13 of the scanner 10 (and therefore to a central axis of the flat plate P).

Referring now to FIGS. 3, 4 and 7A-E, an embodiment of the wheeled cart or scanner 10 includes a carriage 11 that carries the horizontal (first detector) and vertical (second detector) magnet-sensor arrangements 20, 40 and their associated electronics 15 (e.g., an amplifier, analog-to-digital convertor, control board). The horizontal magnet-sensor 20 may be arranged at the vertical centerline 17 of the scanner 10, with the vertical magnet-sensor 40 offset from this centerline 17 toward a forward end 18 or rearward end 19 of the scanner 10. Both sensors 20, 40 may be located on an underside 16 of the scanner 10.

The scanner 10 is arranged to move over a substantially flat surface and can be arranged to that it moves in response to an uneven surface or its height can be adjusted during use. In one embodiment, the scanner 10 is moved by pushing or pulling on a handle 12. In another embodiment, the handle 12 is replaced by remote-activated means of a kind known in the art to drive the wheels 14.

The sensors or sensor arrays 25, 45 are supplied voltage via a battery pack (not shown) and sensor resistance changes with the application of a magnetic field. This change in resistance is amplified and each sensor's data passes to the analog-to-digital converter. The converter preferably takes a point of analog data from each sensor in the array 25, 45 at the same time, converts all of those analog points into digital data, and then sends the digital data to the control board. Processing the sensor data in this way ensures time consistency between sensors. The digital data is passed to the control board, where it is handled by an onboard microcontroller and Ethernet controller before moving via a communication interface or network 70 to a user interface or computing device 80.

The computing device 80 includes a microprocessor 81, memory 83, and a flaw detection method 90 (see FIG. 7) that makes use of the horizontal and vertical magnet sensor arrangements 20, 40. The method 90 and its associated signal processing algorithms are embodied in a non-transitory computer readable medium 83. A set of computer executable instructions stored on the non-transitory computer readable medium 83 and executed by a microprocessor 81 uses the data collected by the horizontal magnet-sensor arrangement 20 to detect a flaw F in the flat plate P and data collected by the vertical magnet-sensor arrangement 40 to determine a location of the detected flaw F relative to a top and bottom surface of the flat plate P.

Figure 5:
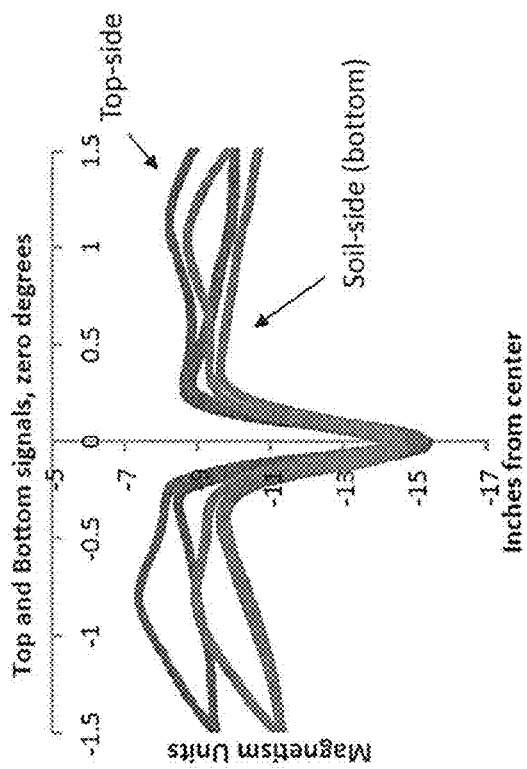
FIG. 5 is a schematic of the computer hardware and software arrangement used to implement the two-component MFL system and method of FIG. 4.
Figure 6:
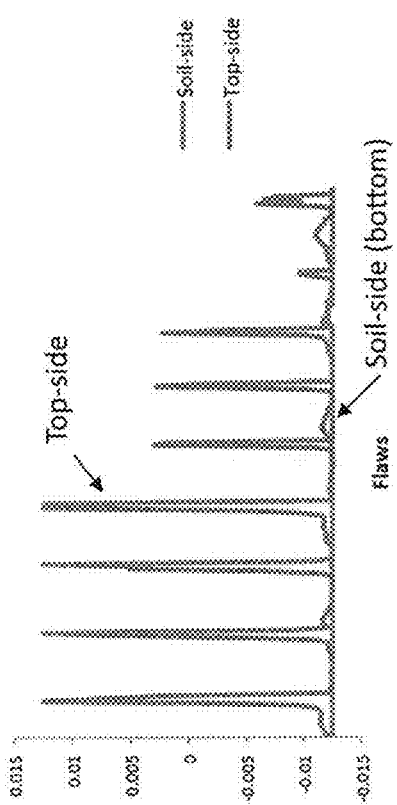
FIG. 6 is a graph showing an example top and bottom flaw response as would be detected by the horizontal magnet-sensor arrangement of FIG. 1 and the horizontal sensor of FIGS. 3A-E.
Figure 4:
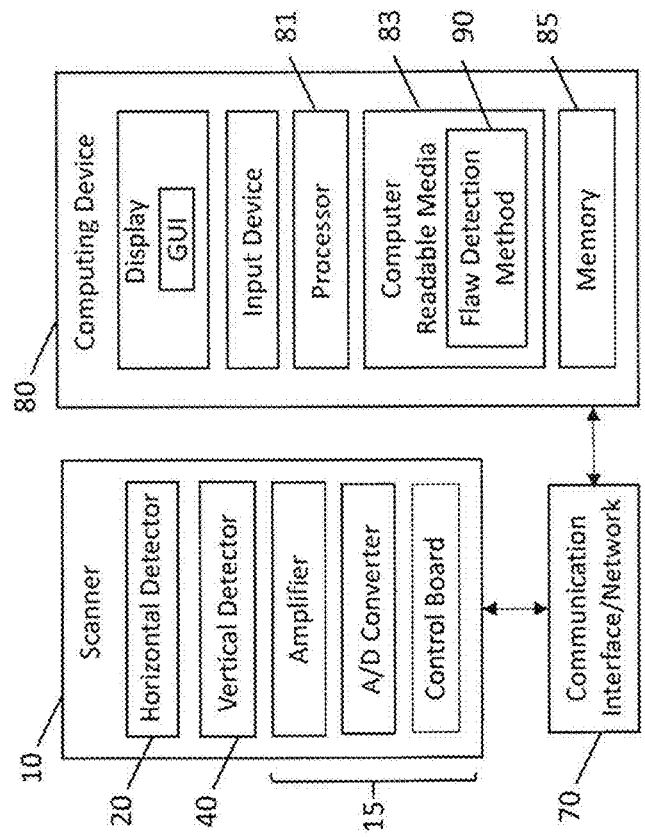
FIG. 4 is a flow chart of a two-component MFL system and method.

FIGS. 5 and 6 provide an example top and bottom (same size) flaw response for each magnet-sensor arrangement 20, 40. For the horizontal arrangement 20, a top and bottom flaw responses are indistinguishable from one another. For the vertical arrangement 40, the top side flaw yields a large response while the bottom side flaw is non-responsive.

Referring now to FIG. 7, an embodiment of the flaw detection method 90 includes the following steps:
- identifying 91 a flaw with the horizontal magnet-sensor arrangement 20;
- visually identifying 93 the flaw location (if possible or practical);
- marking 95 the flaw location and entering its location into a database; and
- analyzing 97 the flaw with the vertical magnet-sensor arrangement 40 to determine whether the flaw is topside or bottom side.

If there is a response from the vertical magnet-sensor arrangement 40, then the flaw is located topside. If there is no response from arrangement 40, then the flaw is located bottom side. The depth of the flaw can then be determined 99 via a response model well known in the art.

The invention itself is defined by the following claims. The scope of the claims include the full range of equivalents to which the recited elements are entitled.

What is claimed:

1. A method for detecting and determining locations of flaws in a magnetic material including a coated surface, the method comprising:
   passing a wheeled scanner over the coated surface of the magnetic material, the wheeled scanner including:
   a first magnetic circuit including
      a first magnet having a north pole end and a south pole end spaced in a horizontal direction from the north pole end of the first magnet, the first magnet located on an underside of the wheeled scanner and generating a first magnetic field in a direction generally parallel to a central horizontal axis of the wheeled scanner and
      a first giant magnetoresistive sensor centered between the north and south pole ends of the first magnet to detect the first magnetic field; and
   a second magnetic circuit including
      a second magnet having a north pole end and a south pole end spaced in a vertical direction from the north pole end of the second magnet, the second magnet being independent of the first magnet, and spaced a horizontal distance from the north and south pole ends of the first magnet, the second magnet located at an end of the wheeled scanner and generating a second magnetic field generally perpendicular to the central horizontal axis of the wheeled scanner and
    a second giant magnetoresistive sensor located directly below the second magnet arranged to detect the second magnetic field;
  a control board including a microprocessor in communication with the first magnetic circuit and the second magnetic circuit, the microprocessor including a flaw location decision tree;
collecting magnetic flux signal data using the first giant magnetoresistive sensor and the second giant magnetoresistive sensor;
sending the magnetic flux signal data to the flaw location decision tree;
using the flaw location decision tree to indicate, solely on the basis of a spike in the magnetic flux signal data of each magnetic circuit, a location of a flaw in the magnetic material;
    wherein if there is a spike in the magnetic flux signal data of the first and second magnetic circuits, the flaw location decision tree indicates the flaw as a topside flaw;
    wherein if there is perturbation spike in the magnetic flux signal data of the first magnetic circuit and no spike in the magnetic flux signal data of the second magnetic circuit, the flaw location decision tree indicates the flaw as a bottom side flaw.

2. The method of claim 1, wherein the magnetic flux signal data is a change in resistance.

3. The method of claim 1, further comprising:
    amplifying the magnetic flux signal data prior to the sending.

4. The method of claim 1, wherein the first and second magnetic fields are independent of one another.

5. The method of claim 1, wherein the magnetic flux data is analog data, the method further comprising;
    converting the analog data into digital data; and
    sending the digital data to the flaw location decision tree.

6. The method of claim 1, wherein the microprocessor includes a magnetic flux signal data response model, the method further comprising:
    determining a depth of the flaw using the magnetic flux signal data response model.

7. The method of claim 1, further comprising:
    marking an area containing the flaw on the coated surface of the magnetic material.

8. The method of claim 1, further comprising:
    entering the location of the flaw into a database.

9. The method of claim 1, further comprising:
    the collecting including analog data points indicating X-Y coordinates of a location along the magnetic material.

10. The method of claim 1, further comprising:
    the collecting including analog data points indicating a time of collection.

11. The method of claim 1, wherein the first magnet is a horseshoe-shaped, opposite pole magnet.

12. The method of claim 1, wherein the second magnet is a bar-shaped, vertically oriented opposite pole magnet.

* * * * *